United States Patent [19]
Randrianaliminana et al.

[11] Patent Number: 5,742,608
[45] Date of Patent: Apr. 21, 1998

[54] DEVICE FOR INTERFACING BETWEEN COMMUNICATIONS MEDIA IN A HOME SYSTEMS NETWORK

[75] Inventors: Pax Randrianaliminana, Plobsheim; Helmut Bürklin, Strasbourg, both of France

[73] Assignee: Thomson multimedia S.A., Courbevoie, France

[21] Appl. No.: 583,236

[22] Filed: Jan. 5, 1996

[30] Foreign Application Priority Data

Jan. 10, 1995 [FR] France ................................... 95 00207

[51] Int. Cl.⁶ .................................................. H04L 5/16
[52] U.S. Cl. ........................ 370/447; 375/211; 178/71.1
[58] Field of Search ................................ 370/419, 420, 370/421, 425, 401, 402, 407, 437, 438, 439, 461, 445, 446, 447, 293, 298; 375/211, 214; 340/825.5; 178/70 R, 71.1, 73, 71.9

[56] References Cited

U.S. PATENT DOCUMENTS

| | | | |
|---|---|---|---|
| 4,070,545 | 1/1978 | Diefenderfer | 178/73 |
| 4,556,881 | 12/1985 | Basile | 178/71.1 |
| 4,577,327 | 3/1986 | Nambu | 375/214 |
| 4,638,298 | 1/1987 | Spiro . | |
| 4,700,342 | 10/1987 | Egami | 370/402 |
| 4,872,183 | 10/1989 | Egami | 375/211 |
| 5,121,410 | 6/1992 | Demarais | 375/211 |
| 5,132,987 | 7/1992 | Motohashi et al. | 375/211 |
| 5,469,473 | 11/1995 | McClear et al. | 370/447 |

FOREIGN PATENT DOCUMENTS

| | | | |
|---|---|---|---|
| 0 081 821 | 6/1983 | European Pat. Off. | H04L 11/16 |
| 0 495 575 | 7/1992 | European Pat. Off. | H04L 12/26 |

Primary Examiner—Chau Nguyen
Attorney, Agent, or Firm—Joseph S. Tripoli; Frederick A. Wein

[57] ABSTRACT

The invention relates to a device for interfacing between at least two communications buses. The device includes a two-way interface for each of the communications buses, a circuit for comparison of messages received by the interfaces, and a circuit for resolving conflicts of priority between messages overlapping in time so that the conflict resolution circuit authorizes the transmission of the higher priority message through the interface or interfaces to the communications buses from which the higher priority message did not originate.

13 Claims, 8 Drawing Sheets

DEVICE FOR INTERFACING BETWEEN COMMUNICATIONS MEDIA IN A HOME SYSTEMS NETWORK

BACKGROUND

The invention relates to a device for interfacing between communications media in a home systems network. It relates more particularly to a repeater intended to serve as interface particularly between two coaxial cables, between two twisted pairs or between a twisted pair and a coaxial cable.

The document "Home Systems Specification—Release 1.1—Mar. 15, 1992" drawn up by the EHSA ("European Home Systems Association") particularly recommends two different types of communications bus interconnection devices: a first device called a router and a second device called a repeater. The router is an apparatus having attractive features, but it is also a relatively complex and costly apparatus.

SUMMARY OF THE INVENTION

The purpose of the present invention is to propose an interconnection or interfacing method and device of the repeater type.

The subject of the invention is a device for interfacing between at least two communications buses, characterized in that it comprises a two-way interface for each of the communications buses, a circuit for comparison of messages received on the said interfaces, a circuit for resolving conflicts of priority between messages overlapping in time, the conflict-resolution circuit authorizing transmission of the priority message, through the said interface or interfaces, to the communications bus from which the said priority message did not originate.

According to one particular embodiment, each two-way interface is linked to a send authorization circuit communicating to it a message to be transmitted on the bus to which the interface is connected under the action of an authorization signal output by the priority-conflict resolution circuit.

According to a particular embodiment, the interfacing device is connected to a first communications bus and to a second communications bus.

According to a particular embodiment, the conflict resolution circuit determines the time delay between the start of two messages received on the two communications buses.

According to one particular embodiment, the time delay is less than the time resolution of the device, then, at first, no transmission authorization signal is generated as long as the two messages include the same information.

According to one particular embodiment, the conflict resolution circuit, for each bit of a message received, creates a comparison window of duration less than the bit period.

According to one particular embodiment, when the time delay is less than the duration of the comparison window, but greater than the time resolution of the device, priority is given, in the first place, to the message having started first, a send authorization signal being generated by the conflict resolution circuit and intended for the send authorization circuit associated with the communications bus from which the priority message did not come.

According to one particular embodiment, as soon as the messages include different information, priority is given to the message including a logic "0", the conflict resolution circuit generating a transmission authorization signal intended for the send authorization circuit associated with that one of the two communications buses from which the priority message did not come.

According to one particular embodiment, as soon as the messages include different information, priority is given to the message including the information having priority in the bus access protocol of the appliances connected to these buses, the conflict resolution circuit generating a transmission authorization signal intended for the send authorization circuit associated with that one of the two communications buses from which the priority message did not come.

According to one particular embodiment, when the time delay is greater than the duration of the comparison window, the priority message is the message having started first, the conflict resolution circuit generating a transmission authorization signal intended for the send authorization circuit associated with that one of the two communications buses from which the priority message did not come.

According to one particular embodiment, the priority message is transmitted intact to the other bus.

According to one particular embodiment, the interfaces are interfaces to a coaxial bus or to a twisted-pair bus.

According to one particular embodiment, the device comprises means for supplying one of the buses with energy from another bus.

BRIEF DESCRIPTION OF THE DRAWINGS

Other characteristics and advantages of the invention will emerge via the description of a particular, non-limiting embodiment, illustrated by the figures among which.

DETAILED DESCRIPTION OF THE PREFERRED EMBODIMENT(S)

Figure 1:
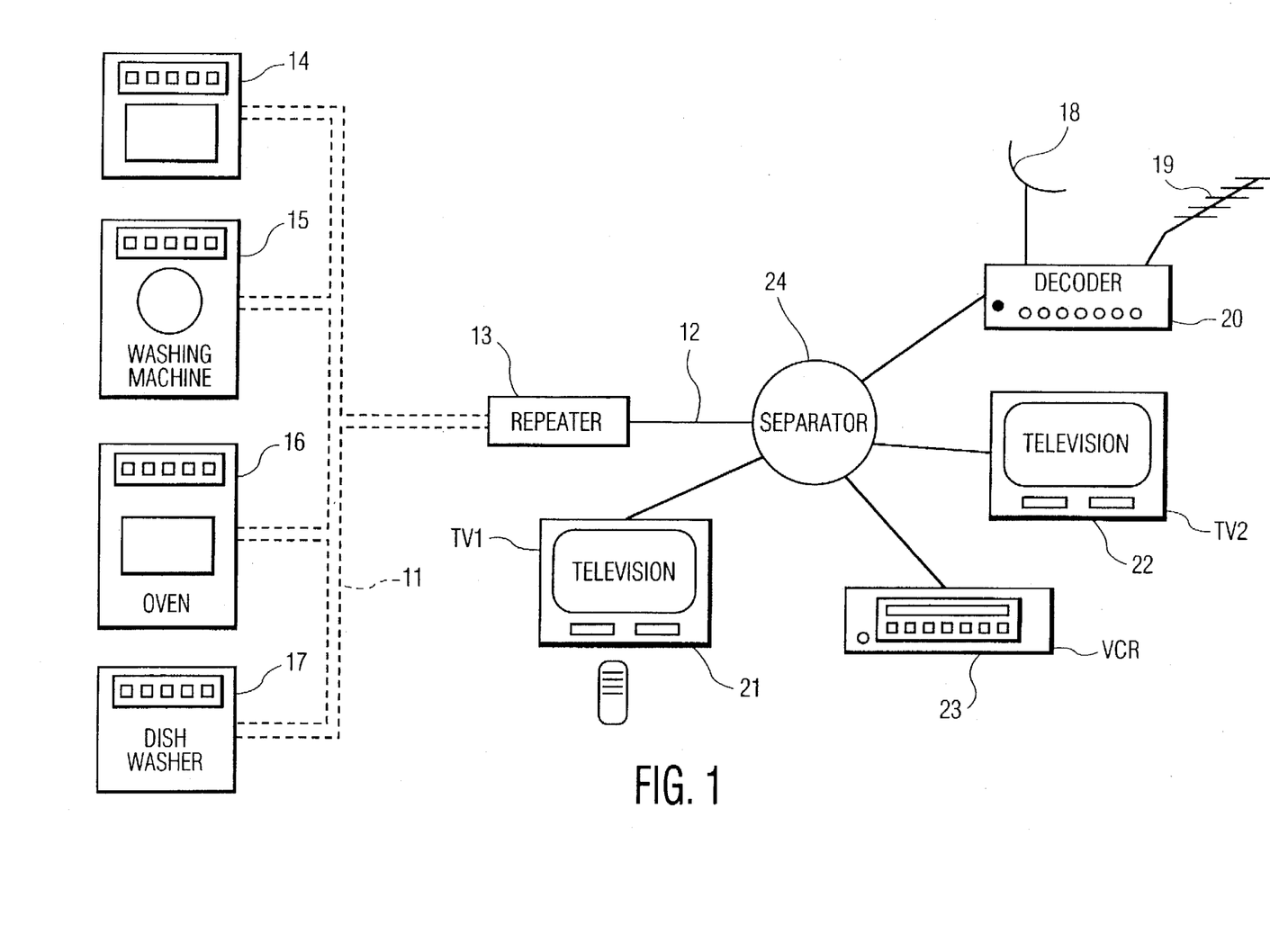
FIG. 1 diagrammatically represents a home systems network employing the device in accordance with one embodiment of the invention, FIG. 2, in the form of a block diagram, represents the device in accordance with the present embodiment of the invention, FIG. 3 represent a block diagram of the block 3 of FIG. 2 according to the present embodiment.

FIG. 1 represents a home systems network in which the device in accordance with the invention is employed. In itself, this network is in accordance with the "Home Systems Release 1.1" specification, also called "HS specification" in what follows, and drawn up by the European Home Systems Association (EHSA).

The network includes a first transmission bus or medium 11 in the form of twisted pairs, and a second transmission bus or medium 12 in the form of coaxial cables connected in a configuration known as "passive star". The two media are connected within the repeater device 13 in accordance with the present example of the invention.

The physical and electrical characteristics, as well as various configurations for interconnection of the twisted pairs and the coaxial cables which are used in the present embodiment, are described in detail in the HS specification. This document also describes the data format used for communication on these media, as well as the communications protocols. Hence, this description will be limited to the details necessary for a clear description of the invention.

The HS specification describes two different types of twisted-pair cables, references TP1 and TP2. In what follows, only twisted pairs of type TP1 will be of interest, with the aim of not confusing the reader.

The cable of the TP1 twisted pair in fact comprises two twisted pairs in the same sheath. One of these pairs is used for data transmission, the other for the power supply. In what follows, reference will be made only to the pair serving for transmission of useful data.

The TP1 twisted pair transmits a signal at a data rate of substantially 9.6 kBaud, coded according to an RZAMI (Return to Zero Alternate Mark Inversion) code, with negative logic. The logic "0s" are coded alternately by a positive and negative voltage level, the logic "1s" being coded by a zero voltage level. A parity bin is added to each character transmitted, chosen no obtain a zero average DC voltage per character.

Each character comprises a START bit, eight data bits b0 to b7 (bin b0 being the least significant bit), an even parity bit and a stop bit. The bits are transmitted in this order, as illustrated above. The START bit is always transmitted with a positive polarity.

| START | b0 | b1 | b2 | b3 | b4 | b5 | b6 | b7 | P | STOP |

The coaxial cable transmits control information ("datagram service") also at a data rate of 9.6 kBaud. The corresponding signal is a baseband signal. The data are also coded in RZAMI code, in a format identical to TP1. The coaxial cable transports other signals on other frequency bands.

By way of example, the TP1 bus is linked to a microwave oven, a washing machine 15, an oven 16 and a dishwasher 17. The TP1-type medium is generally intended for appliance control. The bus TP1 itself is configured into a "daisy chain"; it includes a central cable onto which are grafted the cables going to the various appliances, including the repeater 13.

The coaxial medium is intended rather for transmission of audio or video signals, which are coded or modulated appropriately, the available passband being wider than on twisted pairs. Clearly, control data also flow on this bus. The appliances connected to this bus are, by way of example, a satellite signal decoder 20 to which are connected a parabolic antenna 18 for receiving signals broadcast by satellite and a terrestrial antenna 19, one or more television sets 21 and 22 and a video recorder 23. The decoder 20 is connected to the bus via the output of its UHF modulator. The coaxial bus itself, according to the present example, has a configuration known as "passive start". This configuration consists of a multi-channel central separator 24 to which ends of coaxial cables are connected, the other end of which is connected to the appliances mentioned above. A coaxial cable links the separator 12 and the repeater 13.

The repeater has the function of making the twisted pair-coaxial cable link transparent as far as the control data at the data rate of 9.6 kBaud are concerned. The repeater also has the function of managing the collisions of data sent on the buses which it connects.

It is quite obvious that such a function will not be carried out between the TP1 bus and the coaxial bus for video-type signals with a bandwidth approaching 6 MHz flowing on the coaxial bus, given the difference in passband available according to HS specification on the two media. In the context of the present example, only the control data channel ("Datagram service"), at 9.6 kBaud will be of interest.

Certain aspects of the role of a repeater are tackled in the HS specification, particularly at paragraph 7.1.3.1 of the "Architecture" part.

The various appliances connected to the network implement a protocol for access to the bus to which they are connected. This protocol bears the name CSMA/CA ("Carrier Sense Multiple Access with Collision Avoidance"), and is described in more detail in the HS specification, TP1 part, paragraph 3.5.i.a.

This protocol can be summarized as follows:

An appliance monitors the activity on the network via the bus to which it is connected. If it wishes to send a message, a minimum time t0 must have elapsed since the last activity recorded on the transmission medium (or a channel of this medium). In the context of the present example, this time t0 is equal to:

$$10ms + \text{two bit periods} = 12.290ms.$$

Assigning a channel of the transmission medium to one among several appliances is carried out by comparing the transmitted signals and the received signals, within each appliance. While it is transmitting a logic "1", an appliance will attempt to detect whether another appliance is transmitting a "0". In the event that two appliances respectively transmit a logic "1" and a logic "0", it is the logic "0" which prevails.

When a difference between the signal sent and the signal received is detected, the appliances sending a logic "1" cease sending, while the appliance sending a "0" continues to send. The other appliances wait until the medium is free in order no resume sending.

This behaviour by the appliances connected on either side of the repeater will be put to good use by the latter.

Figure 2:
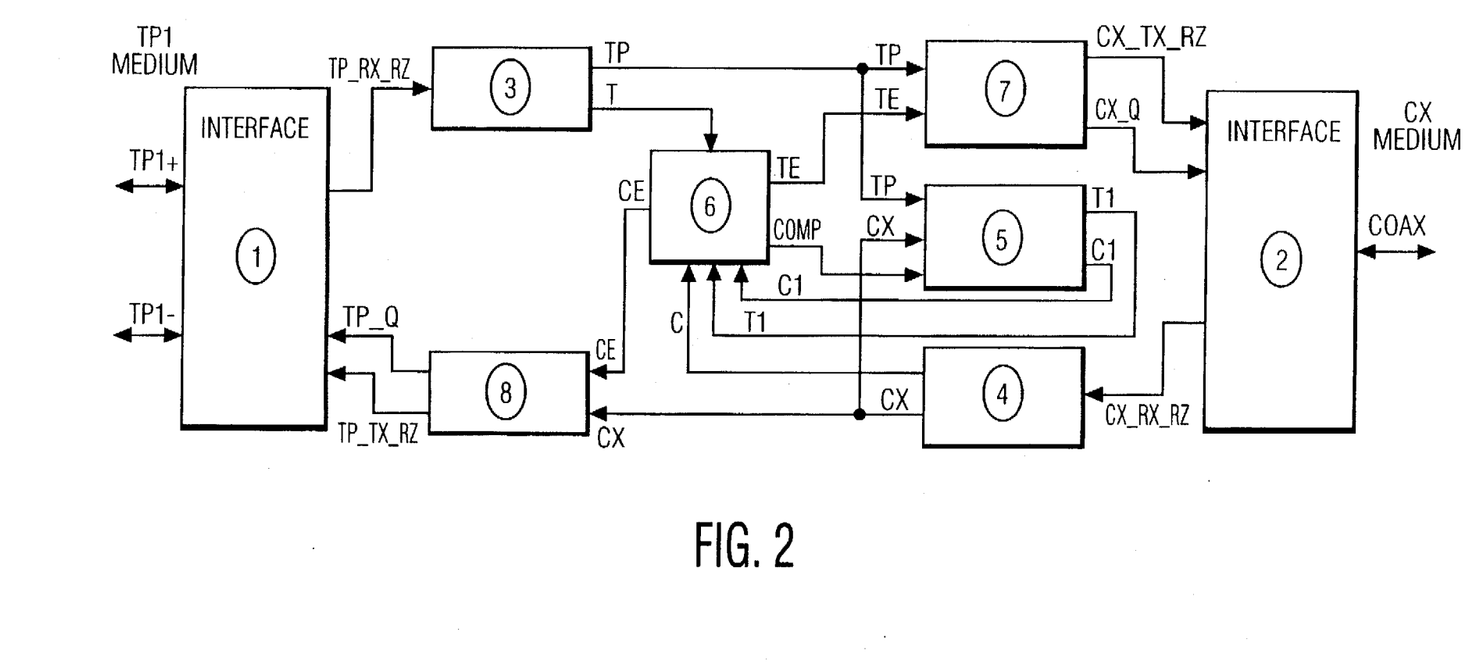

FIG. 2 represents a functional block diagram of the repeater in accordance with the present embodiment. The arrows represent the flow of signals between the various blocks. Two arrows in opposite directions on the same line indicate signal flow in both directions.

In general, the following conventions are used:
TP designates twisted pairs or the signals flowing thereon,
CX designates coaxial cables or the signals flowing thereon,
RX indicates received signals,
TX indicates signals to be transmitted, and
RZ indicates coding in Return to Zero code.

The signals flowing within the repeater are coded in inverse RZ code (inverse return to zero code) in contrast to the signals coded in RZAMI code on the two connected buses. The transcoding is carried out by blocks 1 and 2 so that the repeater can work on binary logic signals with only two voltage levels.

The RZ code is well known to the person skilled in the art. The "0s" are coded using zero-voltage levels, while the "1s" are coded by substantially rectangular pulses, the specific feature of this code being that two "1s" which follow each other are coded by two separate pulses and not by a single pulse of double width. The inverse RZ code codes "0s" and not "1s" using pulses. A mention of percentage following the two letters RZ indicates the duty cycle (duration of pulse over the total duration of one bit).

Figure 7A:
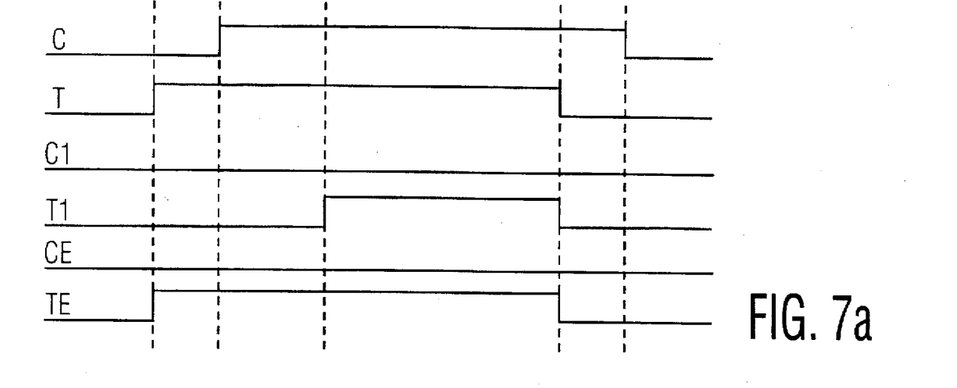
FIGS. 7a to 7c represent timing diagrams of various signals of the device in accordance with the present embodiment, in the case in which a START bit of one message on one of the buses is in advance of a START bit of a message on the other bus.
Figure 7B:
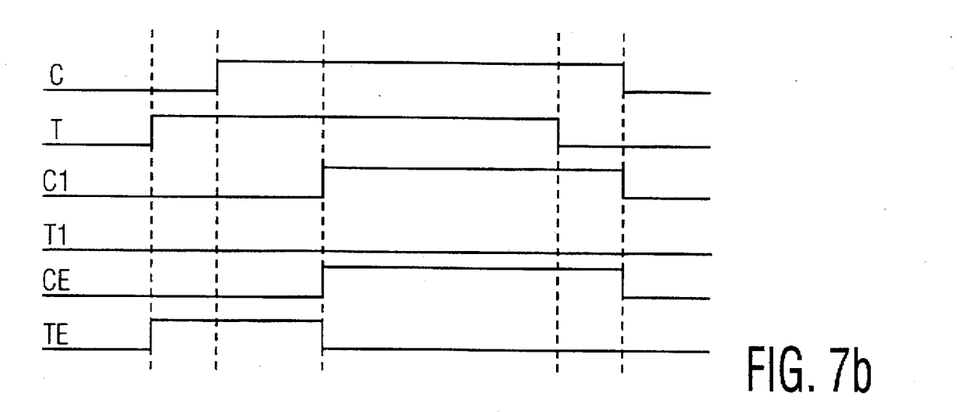
Figure 7C:
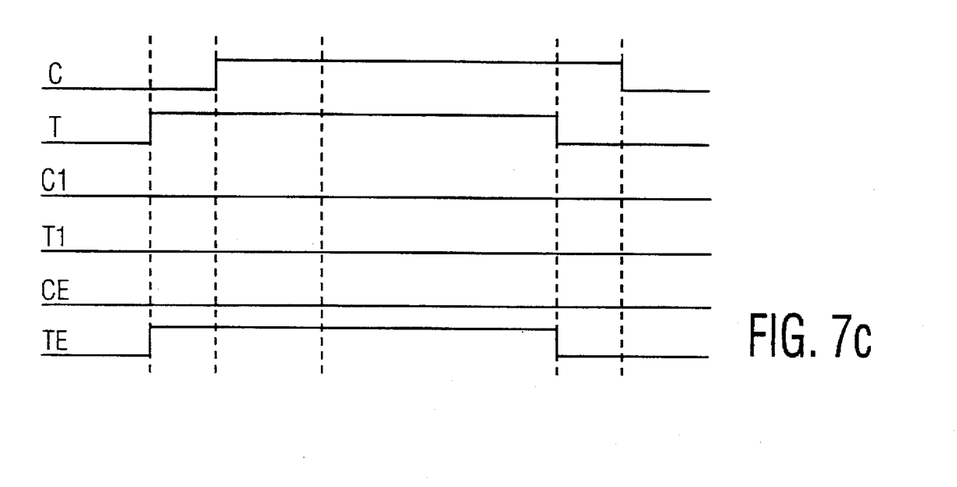

The RZAMI code codes the "1s" by zero levels, the "0s" being coded by pulses of alternately positive and negative polarity. FIG. 7, dealt with later, gives examples of the two codes.

Block 1 represents the analogue interface between the repeater and the twisted-pair bus. This block is connected to the two differential lines TP1+ and TP1− at the input and at the output. Block 2 represents the analogue interface between the repeater and the coaxial bus.

Blocks 1 and 2 carry out the conversion of the RZAMI line code into inverse-logic RZ codes on reception, and carry out the reverse conversion on sending.

Figure 4:
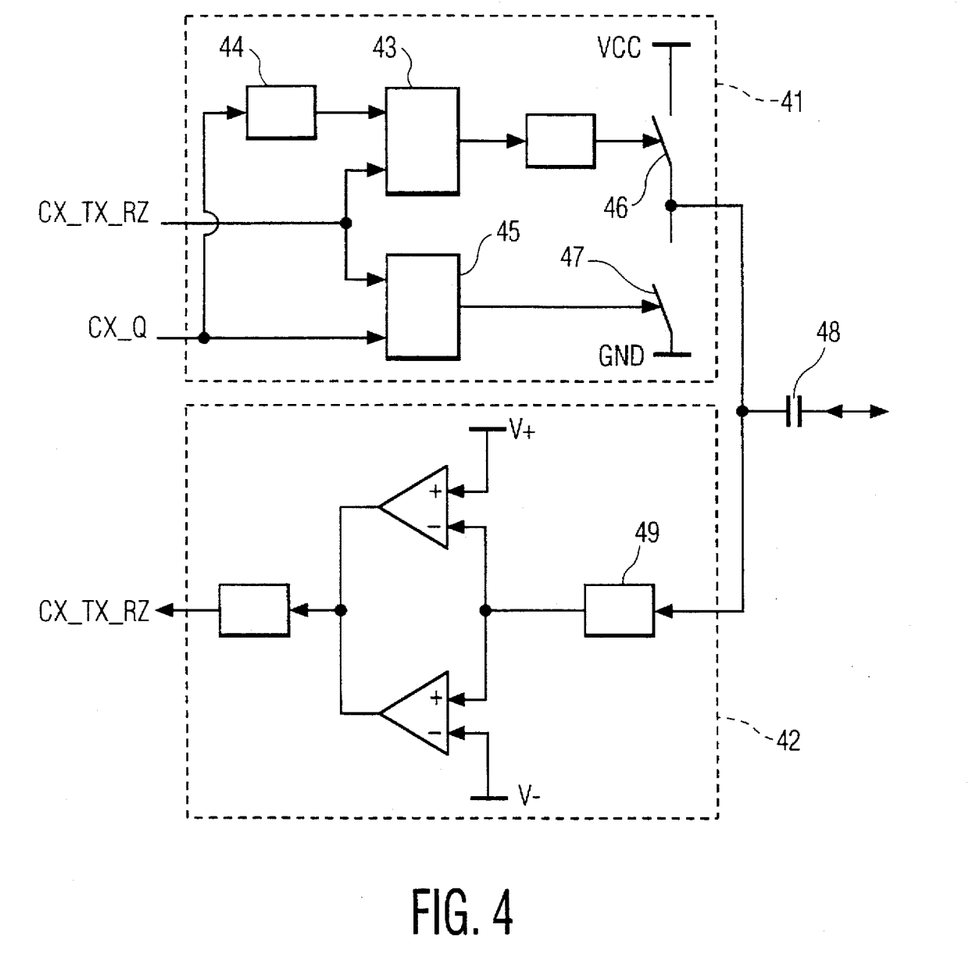
FIG. 4 represents a functional diagram of the analogue interface unit 2 of FIG. 2, according to the present embodiment.

FIG. 4 illustrates the repeater-coaxial interface block 2 used in the present embodiment.

This block 2 includes two distinct parts: the sender assembly 41 and the receiver assembly 42. The receiver assembly 41 will be described first of all, the sender assembly being presented later, this assembly making use of signals produced by blocks the functions of which have not yet been dealt with.

The receiving assembly 42 includes a clamping circuit 49 of a known type intended to clamp the DC voltage of the signal received from the coaxial cable to a voltage which is, for example, 2.5 V, midway between VCC and GND. The clamped signal is compared with a high threshold V+ and with a low threshold V−, intended to detect the positive and negative pulses. A first comparator supplies a low logic level when the clamped signal exceeds the V+ threshold, while a second comparator supplies a low logic level when the clamped signal is lower than the V− threshold. The comparison is carried out by two comparators, the outputs of which are subjected to a logic "OR" (implemented by connecting the outputs of the two comparators), this output then being inverted.

The resultant signal, CX_RX_RZ is thus coded according to an inverse RZ code.

The operation of the block 1 is similar to that of the block 2, the essential difference being the use of differential signals on the two lines TP1+ and TP1−. The functions of the block 2 can be adapted by the person skilled in the art to differential signals such as those present on the conductors TP1+ and TP1− of the twisted-pair cables. The transcoding principles remain the same.

On reception, the signal converted by the block 1 is referenced TP_RX_RZ.

Figure 3:
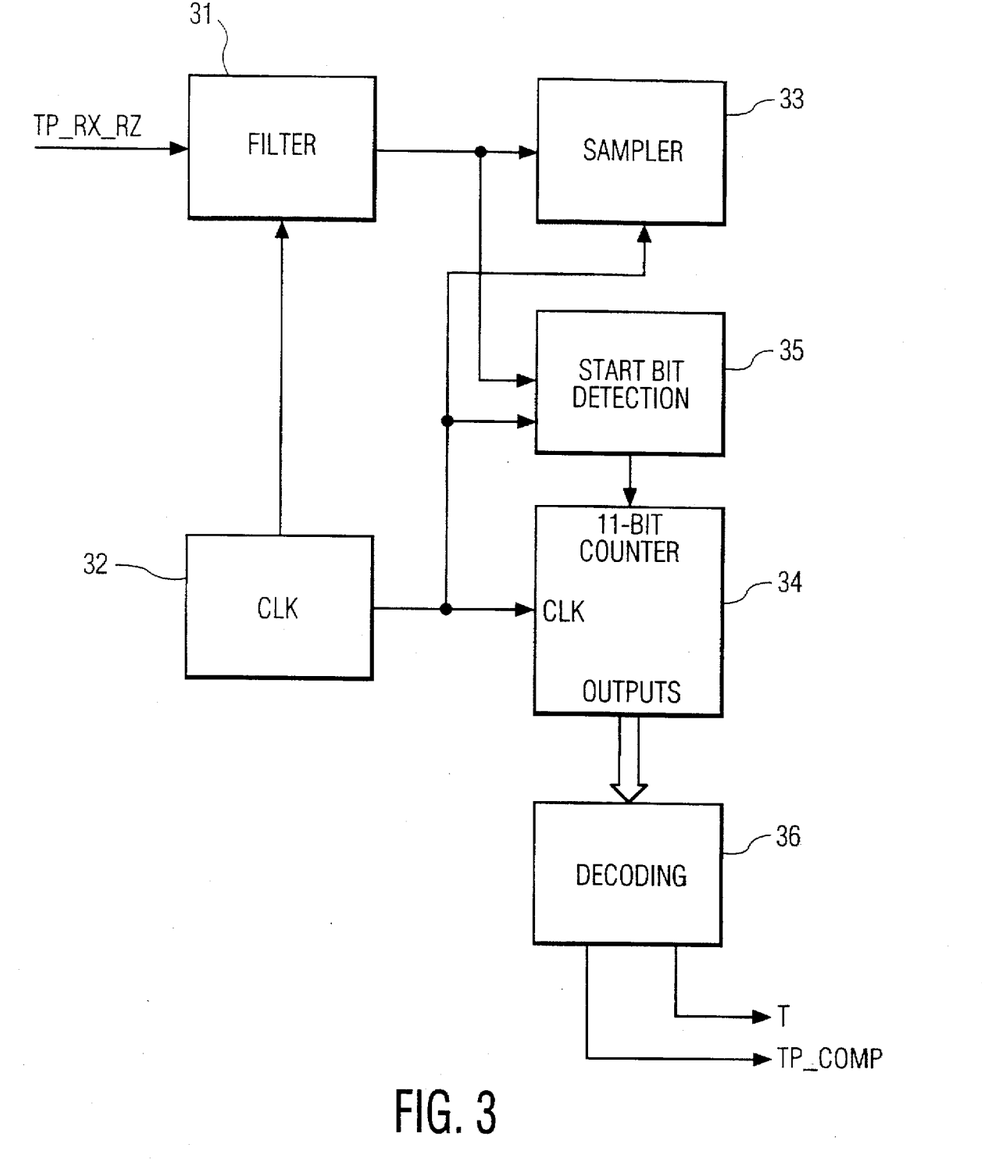

The signals TP_RX_RZ and CX_RX_RZ are processed respectively by the blocks 3 and 4 of FIG. 2. FIG. 3 indicates the operation of block 3, in a more precise way. Block 4 operates in an entirely similar way.

Block 3 filters the signal TP_RX_RZ by a filter 31, which, in the first place, carries out sampling of the signal. According to the present embodiment, the logic level that the samples represent is recognized only if it is confirmed for at least three consecutive samples. The signal thus filtered is resampled by a sampler 33 at the rate of a system clock CLK 32, substantially faster than the bit clock. The system clock has a period, for example, of 814 ns, which corresponds to a frequency of 1.23 MHz. The system clock is thus 128 times faster than the bit clock of 9.6 kHz.

The filtered and resampled signal at the output of block 3 is referenced TP.

Block 3 includes a counter 34, reset to zero when a START bit is detected in the received signal. The counter 34 is linked to the system clock and counts the number of system clock periods since the detection of this bit. A START bit is present at the start of each character transmitted.

The START bit is detected by a detector 35 when a logic level "0", that is to say a positive pulse, is detected on one of the buses when the bus has been inactive or when a STOP bit has previously been detected. The output of the detector 35 is linked to the zero-reset input of the counter 34.

From the value of the counter, a decoder 36 generates a signal indicating the presence or otherwise of a transmission on the bus with which in is associated. As was mentioned above, a character includes 11 bits, which corresponds to 1408 system clock periods. The decoder supplies a signal which will be at an active logic level as long as the state of the counter lies between 1 and 1408. The signal supplied by the decoder of block 3 will be referenced T, while that supplied by block 4 will be referenced C. Obviously, the signals T and C remain inactive as long as a START bit has not been received.

The counter is used for generating other signals in the device, as will be seen during the description of the other blocks. For reasons of clarity, the links between the counter and the other blocks do not feature in FIG. 2.

Block 4 is similar to block 3, but receives the CX_RX_RZ signal and supplies the CX and C signals, corresponding respectively to the TP and T signals.

The comparator block 5 compares the signals TP and CX and detects the differences between the bits represented by these signals. The block supplies two signals: T1 and C1. T1 is activated the first time when TP is different from CX and TP is at the low level (that is to say when a "0" has been identified on the twisted-pair bus). It is deactivated only at the end of the message coming from the twisted-pair bus. C1 is activated the first time TP is different from CX and CX is at the low level (that is to say when a "0" has been identified on the coaxial bus). It is deactivated only at the end of the message coming from the coaxial bus.

T1 and C1 are never active at the same time. A logic diagram of block 5 is given by FIG. 5.

Figure 5:
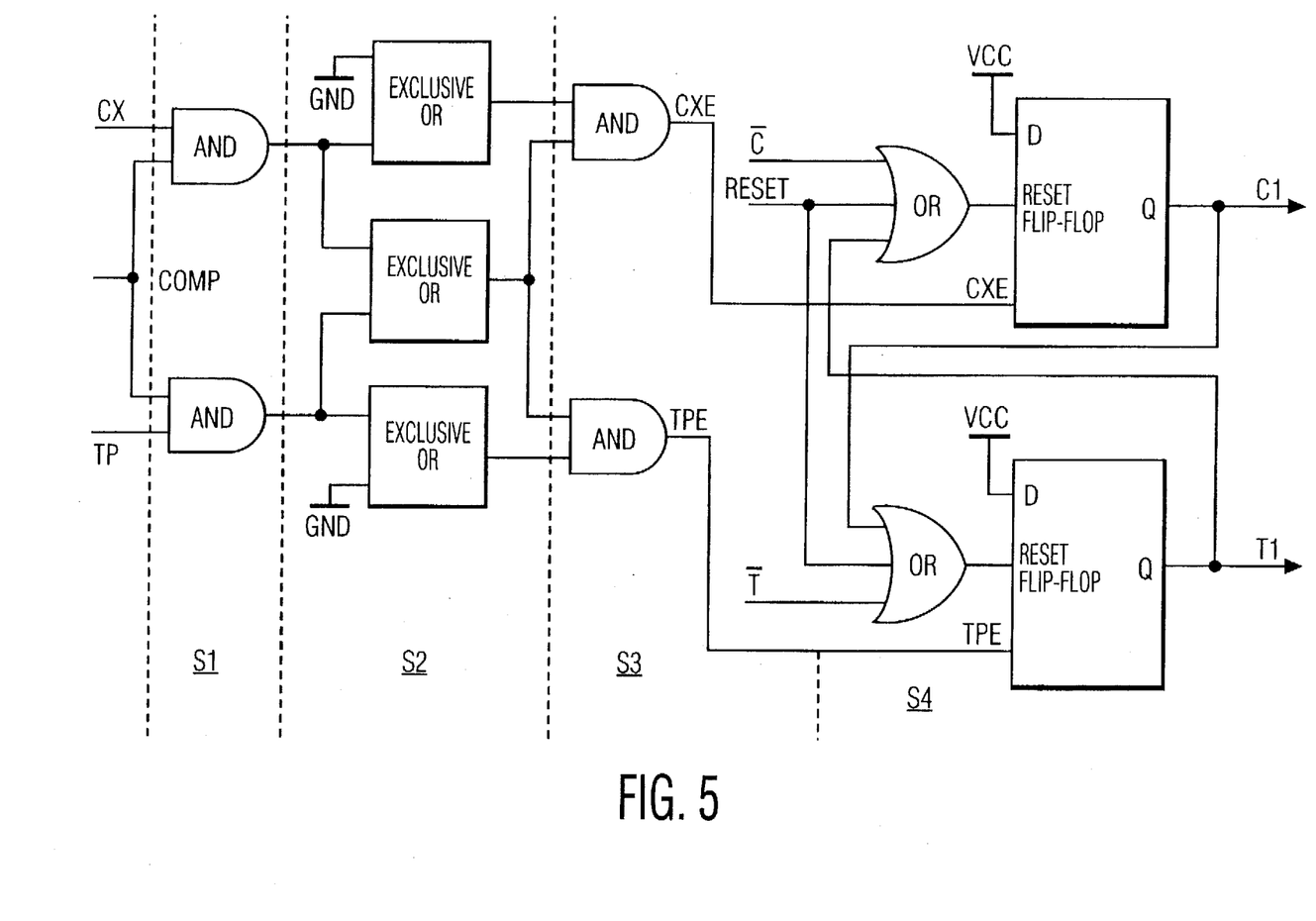
FIG. 5 represents a logic diagram of the comparison unit 5 of FIG. 2, according to the present embodiment.

Comparison of the CX and TP signals is carried out only during the time window COMP generated by block 6, the characteristics of which will be detailed later. It is sufficient to know for the moment that the comparison window is generated in such a way as to permit comparison when the TP and CX signals can be distinguished, in this example during a part of the first half of one bit period when TP and CX are coded in RZ 50% code. In the first stage of block 5 (stage 51), a logic "AND" is performed between respectively the TP and CX signals and the COMP signal.

The stage 52 then implements three exclusive "ORs", each intended no test one of the following conditions:

"Cx is equal to 1"

"TP is equal to 1"

"CX not equal to TP"

A third stage, consisting of two "ANDs", each with two inputs, combines the results of these tests, supplying logic signals corresponding to the following conditions:

"CX is equal to 1" AND "TP is not equal to CX"

"TP is equal to 1" AND "TP is not equal to CX"

The signals at the outputs of the two "ANDs" are designated respectively by CXE and TPE in FIG. 5. Each of the two signals controls the setting to the logic "1" state of one of two flip-flops (stage 54), the respective Q outputs of which correspond to the signals C1 and T1.

A first flip-flop receives the signal CXE on its clock input, a voltage VCC corresponding to a logic "1" on its D input. The flip-flop can be reset by a logic "1" on one of the three following signals: a generic "RESET" signal which is active, for example, upon initialization of the circuit, the signal NON(C), C indicating the presence of a message on the coaxial bus, and, finally, the signal T1 coming from the second flip-flop. The signal NON(C) resets the flip-flop to zero at the end of a message on the coaxial bus. The reset to zero by means of T1 serves to prevent possible strays capable of making C1 change to 1 although T1 is active.

The output Q of the first flip-flop corresponds to the signal C1.

The second flip-flop repeats the same principles as the first flip-flop to generate T1 instead of C1.

The block 6 is the block which decides on the behaviour of the repeater on the basis of the signals present on the buses which it interconnects. The block 6 receives the signals TP and T, CX and C as well as the signals T1 and C1.

The block 6 derives the signals TE and CE, which authorize respectively the transmission of the signals present on the twisted-pair bus to the coaxial bus and conversely. These signals control blocks 7 and 8 described later.

Figures 6A, 6B, 6C:
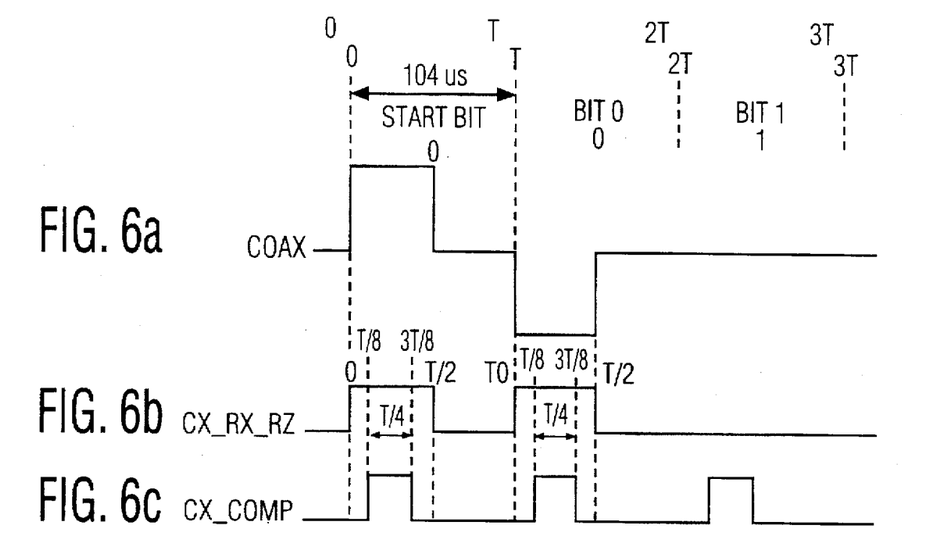
FIGS. 6a to 6h represent timing diagrams of various signals used by the device in accordance with the present embodiment.
Figure 6D:
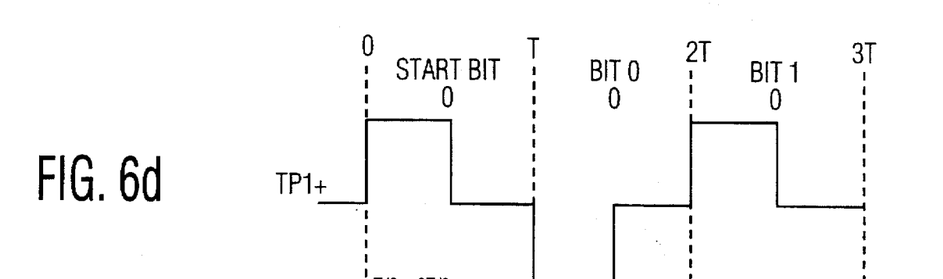
Figure 6E:
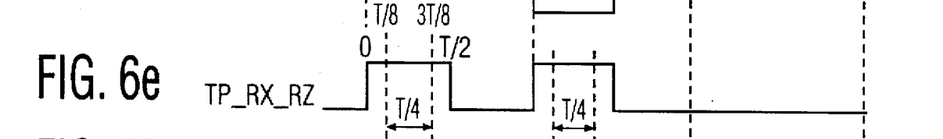

FIGS. 6a and 6d give an example of signals as detected on the coaxial and TP1+ cable. The sequence of data bits corresponds to "001" for the coaxial cable and to "000" for TP1+. FIGS. 6b and 6e illustrate the corresponding signals CX_RX_RZ and TP_RX_RZ as they are presented at the output of the block 2. For clarity of explanation, it is assumed in what follows that the signals CX and TP are identical to the signals CX_RX_RZ and TP_RX_RZ.

From the states of the counters of blocks 3 and 4, the decoders placed at the output of the said counters generate a comparison window, for each bit, of width T/4, where T is the period of the bit clock. This comparison window lasts from the instant T/8 to the instant 3T/8 of each bit, centred around the middle of the positive pulse. The values given are matched to the RZ code at 50%, as illustrated by FIGS. 6a, 6b, 6d and 6e. In this case, in fact, the pulse corresponding to a logic "0" lasts only T/2. It is obviously possible to use other widths and siting of the comparison windows, in the case of this 50% code, but more particularly in the case of a different code.

Figures 6F, 6G:
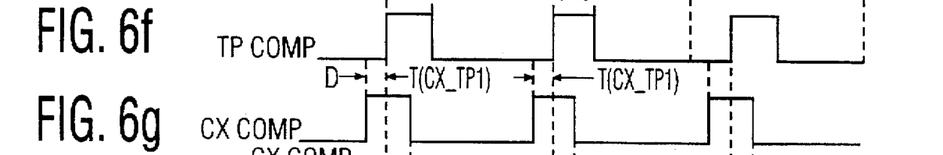
Figure 6H:
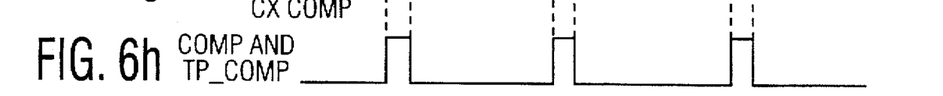

The comparison windows resulting from the signals of FIGS. 6b and 6e are illustrated on the timing diagrams of FIGS. 6c and 6f. Block 6 performs a logic "AND" between these two windows. The result of this "AND", called COMP, is illustrated by the timing diagram of FIG. 6h. The advance of one window over the other is denoted D, the width of the window COMP being T/4-D. FIG. 6g repeats FIGS. 6c in order to show the comparison performed more clearly.

Block 6 distinguishes three different cages: A, B and C, each corresponding to a different bracket for D.

In case A, the advance D is less than one period of the system clock, which period, according to the present example, is of 814 ns. A START bit has been detected on the two buses. With the advance being smaller than the time resolution of the device, it is impossible to say which of the two signals was sent first.

In the first place, neither CE nor TE are activated, as long as the signals on the two sides of the repeater are identical, that is to say as long as the signals C1 and T1 are in the inactive state.

As soon as the comparison of the signals TP and CX shows a difference between the signals on the two buses, one of the signals C1 or T1 passes to the active state. As described above, C1 indicates that TP and CX are different and than the current bit on CX is a "0" bit. Symmetrically, T1 indicates that TP and CX are different and that TP indicates a logic "0". As the logic "0" has priority over the logic "1" because of the appliance network access protocol, block 6 activates the signal TE if T1 is active and the signal CE if C1 is active. In this case, transmission of a message on a first one of the two buses to the second bus is authorized. As the message transmitted by the repeater includes a logic "0" at the time when in is authorized to pass, the sending appliance or appliances on the second bus are in a position to detect the arrival of this message and stop sending. As the start of the message was identical on the two buses, no information is lost from the message transmitted. The appliances which interrupted their sending will resume sending their message from the start thereof. These interrupted messages are therefore not lost either. Once activated, either the signal TE or the signal CE is kept active up to the end of the message transmitted to the second bus, which guarantees intact transmission of the message on this second bus.

In case B, the duration D lies between one system clock period and a quarter of a bit clock period (T/4), in this instance between 814 ns and 26 μs. As was specified above, the value of 814 ns corresponds to the time resolution of the system. The value T/4 is the width of the comparison windows. It can easily be seen in FIG. 6h that the window COMP disappears when the duration D is greater than T/4.

In case B, in the first place, than one of the two messages which is in advance of the other is transmitted: if the START bit of TP is detected first, block 6 activates TE, whereas CE remains inactive, and if the start bit of CX is detected first, CE is activated, while TE remains inactive.

The signals TP and CX are continually compared by the block 5. If the signal C1 is activated, then block 6 activates the signal CE (TE remaining inactive), whereas if signal T1 is activated, block 6 activates the signal TE (CE remaining inactive).

To put it another way, when two messages are sent, each of them on one of the two buses at an interval of less than T/4, the message sent first is transmitted to the bus on which the massage sent second is flowing. This transmission authorization is temporary, in the sense that, when a disparity appears between the messages, priority is immediately given to the message which, upon detection of the disparity, is transmitting a logic "0". Hence, in certain cases, there may be a reversal of the direction of transmission from one bus to the other. The fact of reversing the direction of transmission immediately, even within a bit, allows the appliance sending the message transmitting a logic "1" at the same moment to detect the logic "0" transmitted by another appliance and to stop its transmission as a consequence, in accordance with the CSMA/CA protocol. The direction of transmission is maintained until the end of the message.

The last case, case C, occurs when the time delay D between the START bits is greater than T/4. In this case, the first message detected by the device in accordance with the present embodiment has priority: TE or CE is activated in consequence by block 6. No change of direction of transmission is authorized until the end of the message.

FIGS. 7a, 7b and 7c represent timing diagrams of the signals C, T, C1, T1, CE and TE when the START bit of a message on the twisted-pair bus is detected first. This can be seen from the fact that the rising edge of T is in advance of the rising edge of C, which has the consequence of activating TE and thus transmission towards the coaxial bus.

FIG. 7a represent the case in which, with a difference having been detected between the message received on the twisted-pair bus by the repeater and the message received on the coaxial bus, the conflict is resolved in favour of the message on the twisted-pair bus, T1 indicating that it is this message which includes a "0" at the moment when this difference is detected. TE is then kept active as long as T is active.

FIG. 7b represents the case in which the conflict is resolved in favour of the message on the coaxial bus. TE is then deactivated, while CE is activated as long as C remains active.

FIG. 7c illustrates the case where no conflict is detected.

FIGS. 7a to 7c also make it possible to describe the operation of the system when C is in advance of T. Given the symmetry of the system, it suffices to swap the references T and C.

Figure 8A:
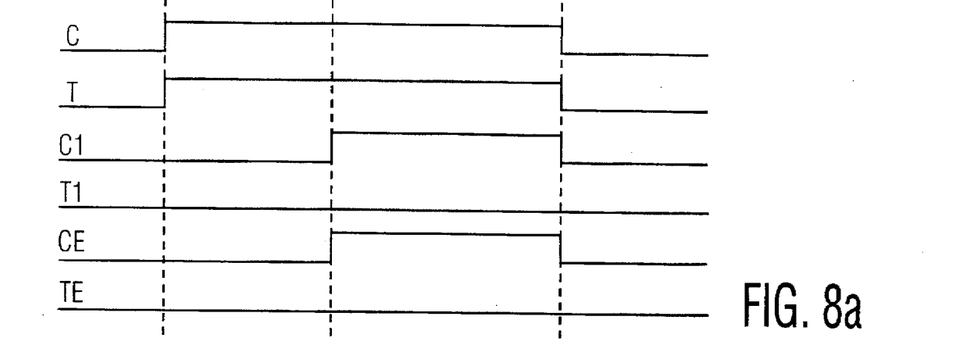
FIGS. 8a to 8c represent timing diagrams of certain signals of the device in accordance with the invention, in the case of the detection of two START bits, one of which is in advance of the other by a maximum duration.
Figure 8B:
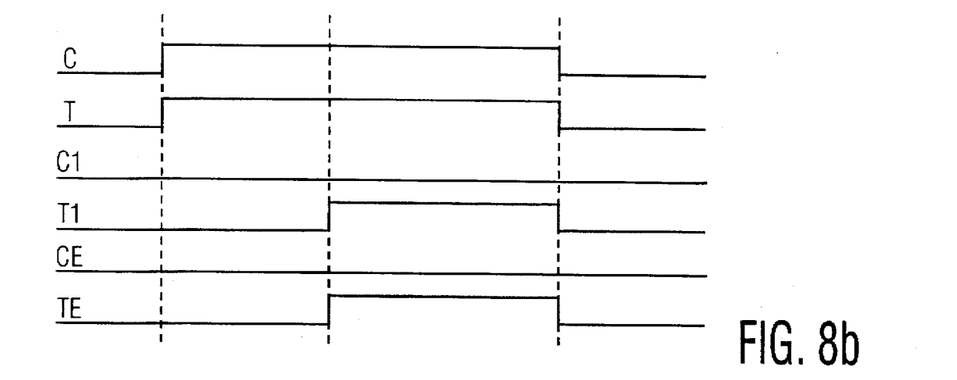
Figure 8C:
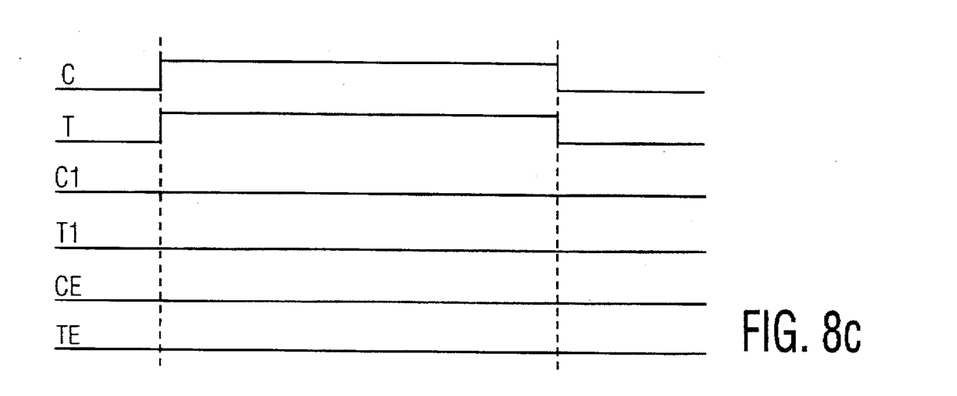

FIGS 8a, 8b and 8c illustrate the case in which the time delay between the two START bits is less than the duration of a system clock period: the circuit considers that the rising edges of the signals C and T arrive at the same time. As long as the signals C1 and T1 are inactive, that is to say as long as the message are identical on both sides of the repeater, neither TE nor CE are activated.

When a difference is detected between the messages, which is as previously explained, it is the message representing a logic "0" which has the priority allocated to it. In this instance, when C1 is active, CE is activated until the end of the message originating from the coaxial cable (FIG. 8a), whereas when T1 is active, it is TE which is activated as long as the message originating from the TP bus is not terminated (FIG. 8b).

FIG. 8c illustrates the case in which the messages are identical on both buses throughout the duration of these messages.

Blocks 7 and 8 authorize or do not authorize the signals CX or TP to pass to the interface blocks 2 and 1. The conducting or non-conducting state is determined by the state of the CE or TE signals. According to one particularly simple embodiment, blocks 7 and 8 each comprise a two-input logic "AND". Moreover, these blocks generate signals Cx_Q and TP_Q which indicate the parity of the pulses respectively on TP and CX: these signals will allow the interface blocks 2 and 1 to reverse the polarity of the AMI pulses on the coaxial bus and twisted-pair bus. The signal CX_Q and TP_Q are derived, the example, by flip-flops which divide the signals CX and TP respectively by two. The flip-flops are, obviously, set to zero upon detection of the respective START bits, and react to the rising edges of CX and TP.

The signals CX and TP are transmitted, as appropriate, to blocks 2 and 1, that is to say to the analogue interfaces between the repeater and the buses. Data sending on the bus is performed, in block 2, by the assembly 42, illustrated in FIG. 4.

The sending assembly 42 receives the signal CX_TX_RZ, a logic signal derived by the block 7. This assembly additionally receives the signal CX_Q from block 7. The signal CX_Q gives the parity of the pulses currently transmitted on the TP bus. Knowledge of this information makes it possible, on the one hand, to code the first bit (START bit) with a positive pulse, as required particularly by the HS specification, and on the other hand to code the "0s" alternately with a positive or negative pulse.

Symmetrically, block 1 receives a signal TP_Q, generated by block 8.

The signal CX_TX_RZ undergoes a first logic "AND" 43 with the parity signal inverted by an inverter 44, and a second logic "AND" 45 with The signal of non-inverted parity. The output of the first "AND", in the active state, controls closing of a switch 46 linking a VCC voltage to the coaxial cable, while the output of determined by the state of the CE or TE signals. According to one particularly simple embodiment, blocks 7 and 8 each comprise a two-input logic "AND". Moreover, these blocks generate signals CX_Q and TP_Q which indicate the parity of the pulses respectively on TP and CX: these signals will allow the interface blocks 2 and 1 to reverse the polarity of the AMI pulses on the coaxial bus and twisted-pair bus. The signals CX_Q and TP_Q are derived, for example, by flip-flops which divide the signals CX and TP respectively by two. The flip-flops are, obviously, set to zero upon detection of the respective START bits, and react to the rising edges of CX and TP.

The signals CX and TP are transmitted, as appropriate, to blocks 2 and 1, that is to say to the analogue interfaces between the repeater and the buses. Data sending on the bus is performed, in block 2, by the assembly 42, illustrated in FIG. 4.

The sending assembly 42 receives the signal CX_TX_RZ, a logic signal derived by the block 7. This assembly second "AND", in the active state, controls closing of a switch 47 linking a voltage GND to the coaxial cable.

Hence, the signal present on a bus can be transmitted to the other bus.

The coaxial cable is linked to the assembly 41 as is the assembly 42 via a clamping capacitor 48.

According to a variant embodiment, the device includes two analogue interfaces of the same type.

According to another embodiment variant, the device includes means for electrical insulation between the two buses.

According to another embodiment variant, the device includes an electrical power supply intended to supply at least one of the two networks.

According to a fourth embodiment variant, the device includes means of supplying one of the buses from the energy available on the other bus.

The invention is not limited to a repeater linking two buses, but can be generalized to more than two buses.

According to the embodiment which has just been described, when there is conflict between two messages, priority is given to the one including a logic "0" at the time when the messages start to differ. The fact that the "0" has priority before the "1" is derived from the CSMA/CA protocol. It is quite obvious that the invention is not limited to this protocol, and that, in a system employing another type of protocol, the may have priority.

One advantage of the invention is that all the elements making up the device (apart from certain parts of the analogue interfaces 1 and 2) can be implemented in a programmable logic circuit in the form of combinational and sequential logic. A microprocessor or microcontroller is not absolutely necessary, which correspondingly reduces the complexity and the cost of the system.

We claim:

1. Device for interfacing between at least two communications buses comprising:
    a two-way interface for each of the said communications buses,
    a circuit for comparison of messages received by said interfaces,
    a circuit for resolving conflicts of priority between messages overlapping in time, said circuit for resolving conflicts of priority determining among said messages overlapping in time a message having priority, said conflict-resolution circuit authorizing transmission of said message having priority, through said interface or interfaces, to the communications bus from which said message did not originate, wherein said determination of said message having priority is made as a function of the time delay between the start of said overlapping messages and the result of the comparison between said messages.

2. Device according to claim 1, wherein each two-way interface is linked to a send authorization circuit communicating to it a message to be transmitted on the bus to which said interface is connected under the action of an authorization signal output by the priority-conflict resolution circuit.

3. Device according to claim 2, wherein said interfacing device is connected to a first communications bus and to a second communications bus.

4. Device according to claim 3, wherein said conflict resolution circuit determines the time delay between the start of two messages received on the two communications buses.

5. Device for interfacing between at least two communications buses comprising:
- a two-way interface for each of the said communications buses,
- a circuit for comparison of messages received by said interfaces,
- a circuit for resolving conflicts of priority between messages overlapping in time, said conflict-resolution circuit authorizing transmission of said message having priority, through said interface or interfaces to the communications bus from which said message did not originate,
- each two-way interface is linked to a send authorization circuit communicating to it a message to be transmitted on the bus to which said interface is connected under the action of an authorization signal output by the priority-conflict resolution circuit,
- said interfacing device is connected to a first communications bus and to a second communications bus,
- said conflict resolution circuit determines the time delay between the start of two messages received on the two communications buses,
- said device having a given time resolution, if said time delay is less than the time resolution, then no transmission authorization signal is generated as long as the two messages are identical.

6. Device for interfacing between at least two communications buses comprising:
- a two-way interface for each of the said communications buses,
- a circuit for comparison of messages received by said interfaces,
- a circuit for resolving conflicts of priority between messages overlapping in time, said conflict-resolution circuit authorizing transmission of said message having priority, through said interface or interfaces to the communications bus from which said message did not originate,
- each two-way interface is linked to a send authorization circuit communicating to it a message to be transmitted on the bus to which said interface is connected under the action of an authorization signal output by the priority-conflict resolution circuit.
- said interfacing device is connected to a first communications bus and to a second communications bus,
- said conflict resolution circuit determines the time delay between the start of two messages received on the two communications buses,
- said conflict resolution circuit, for each bit of a message received, creates a comparison window of duration less than a bit period.

7. Device according to claim 6, wherein said device having a given time resolution, when said time delay is less than the duration of the said comparison window, but greater than the time resolution, priority is given, in the first place, to the message having started first, a send authorization signal being generated by the conflict resolution circuit and intended for the send authorization circuit associated with the communications bus from which the priority message did not come.

8. Device according to claim 5, wherein, as soon as messages differ, priority is given to the message including a logic "0" at the time a difference between said messages is detected, said conflict resolution circuit generating a transmission authorization signal intended for the send authorization circuit associated with the bus from which the message having priority did not come.

9. Device according to claim 5, wherein, as soon as the messages include different information, priority is given to the message including the information having priority in the bus access protocol of the apparatuses connected to these buses, the said conflict resolution circuit generating a transmission authorization signal intended for the send authorization circuit associated with the bus from which the message having priority did not come.

10. Device according to claim 6, wherein when said time delay is greater than the duration of the comparison window, the priority message is the message having started first, said conflict resolution circuit generating a transmission authorization signal intended for the send authorization circuit associated with the bus from which the priority message did not come.

11. Device according to claim 10, wherein said priority message is transmitted intact to the other bus from which the message having priority did not come.

12. Device according to claim 3 wherein said interfaces are interfaces to a coaxial bus or to a twisted-pair bus.

13. Device according to claim 1, further comprising means for supplying one of the buses with power from another bus.

* * * * *